US010844238B2

(12) United States Patent
Deore et al.

(10) Patent No.: US 10,844,238 B2
(45) Date of Patent: Nov. 24, 2020

(54) COPPER INK AND CONDUCTIVE SOLDERABLE COPPER TRACES PRODUCED THEREFROM

(71) Applicant: National Research Council of Canada, Ottawa (CA)

(72) Inventors: Bhavana Deore, Ottawa (CA); Chantal Paquet, Ottawa (CA); Xiang Yang Liu, Nepean (CA); Patrick Malenfant, Orleans (CA)

(*) Notice: Subject to any disclaimer, the term of this patent is extended or adjusted under 35 U.S.C. 154(b) by 3 days.

(21) Appl. No.: 16/321,076

(22) PCT Filed: Jul. 19, 2017

(86) PCT No.: PCT/CA2017/050870
§ 371 (c)(1),
(2) Date: Jan. 28, 2019

(87) PCT Pub. No.: WO2018/018136
PCT Pub. Date: Feb. 1, 2018

(65) Prior Publication Data
US 2019/0177565 A1 Jun. 13, 2019

Related U.S. Application Data

(60) Provisional application No. 62/367,810, filed on Jul. 28, 2016.

(51) Int. Cl.
*B32B 3/00* (2006.01)
*C09D 11/52* (2014.01)
(Continued)

(52) U.S. Cl.
CPC ............ *C09D 11/52* (2013.01); *B41M 3/006* (2013.01); *B41M 7/009* (2013.01); *C08J 7/0427* (2020.01);
(Continued)

(58) Field of Classification Search
CPC ...... C09D 11/52; C09D 11/102; C09D 11/037; C09D 11/107; C09D 11/08; C09D 11/103;
(Continued)

(56) References Cited

U.S. PATENT DOCUMENTS 4,248,921 A 2/1981 Steigerwald et al.
4,396,666 A 8/1983 Ernsberger
(Continued)

FOREIGN PATENT DOCUMENTS

JP 2014182913 A 9/2014
KR 2012/0132424 A 12/2012
(Continued)

OTHER PUBLICATIONS

International Search Report and Written Opinion dated Oct. 4, 2017 on PCT/CA2017/050870.
(Continued)

*Primary Examiner* — Elizabeth E Mulvaney
(74) *Attorney, Agent, or Firm* — Brunet & Co. Ltd.

(57) ABSTRACT

An ink contains an admixture of a copper nanoparticle, a copper precursor molecule (e.g. a copper-aminediol complex), and a polymeric binder, the polymeric binder containing a polyester, polyimide, polyether imide or any mixture thereof having surface 5 functional groups that render the polymeric binder compatible with and/or soluble in a diol. The ink may be deposited on a substrate providing a trace that is conductive and directly solderable and has better mechanical strength than copper inks containing other types of polymeric binders.

17 Claims, 2 Drawing Sheets

Electron Image 1

(51) Int. Cl.
  *C09D 11/037* (2014.01)
  *C09D 11/102* (2014.01)
  *C08J 7/04* (2020.01)
  *B41M 3/00* (2006.01)
  *B41M 7/00* (2006.01)
  *C09D 11/08* (2006.01)
  *C09D 11/103* (2014.01)
  *C09D 11/104* (2014.01)
  *C09D 11/106* (2014.01)
  *C09D 11/107* (2014.01)

(52) U.S. Cl.
  CPC ............ *C09D 11/037* (2013.01); *C09D 11/08* (2013.01); *C09D 11/102* (2013.01); *C09D 11/103* (2013.01); *C09D 11/104* (2013.01); *C09D 11/106* (2013.01); *C09D 11/107* (2013.01); *C08J 2367/02* (2013.01); *C08J 2379/08* (2013.01); *C08J 2467/00* (2013.01)

(58) Field of Classification Search
  CPC .... C09D 11/104; C09D 11/106; B41M 3/006; B41M 7/009
  See application file for complete search history.

(56) References Cited

U.S. PATENT DOCUMENTS

| | | | |
|---|---|---|---|
| 4,687,597 | A | 8/1987 | Siuta |
| 5,045,236 | A | 9/1991 | Tsunaga et al. |
| 5,248,451 | A | 9/1993 | Tsunaga et al. |
| 6,036,889 | A | 3/2000 | Kydd |
| 7,211,205 | B2 | 5/2007 | Conaghan et al. |
| 7,731,812 | B2 | 6/2010 | Wang et al. |
| 9,145,503 | B2 | 9/2015 | Yu et al. |
| 2008/0108218 | A1 | 5/2008 | Kodas et al. |
| 2010/0009071 | A1 | 1/2010 | Chopra et al. |
| 2015/0257279 | A1 | 9/2015 | Shahbazi et al. |
| 2017/0190930 | A1* | 7/2017 | Lee ..................... C09D 11/037 |

FOREIGN PATENT DOCUMENTS

| | | |
|---|---|---|
| KR | 101350507 B | 1/2014 |
| KR | 2015/0045605 A | 4/2015 |
| KR | 2015/0077676 A | 7/2015 |
| KR | 2015/0082133 A | 7/2015 |
| WO | 2013/128449 A2 | 9/2013 |
| WO | 2014/156326 A1 | 10/2014 |

OTHER PUBLICATIONS

Chen W, Deng D, Chenge Y, Xiao F. J. (2015) Electronics Materials. 44(7), 2479.
Chung W, Hwang H, Kim H. (2015) Thin Solid Films. 580, 61-70.
Curtis C, Rivkin T, Miedaner A, Alleman J, Perkins J, Smith L, Ginley D. (2001) NREL/CP-520-31020.
Dang Z-M, Zhang B, Li J, Zha J-W, Hu G-H. (2012) J. Applied Polymer Science. 126, 815.
Farraj Y, Grouchko M, Magdassi S. (2015) Chem. Commun. 51, 1587.
Hu Y, An B, Niu C, Lv W, Wu Y. (2014) International Conference on Electronic Packaging Technology. 1565.
Lee B, Kim Y, Yang S, Jeong I, Moon J. (2009) Current Applied Physics. 9, e157-e160.
Pham Lq, Sohn Jh, Kim Cw, Park Jh, Kang Hs, Lee Bc, Kang Ys. (2012) J. Colloid and Interface Science. 365, 103-109.
Schulz Dl, Curtis Cj, Ginley Ds. (2001) Electrochemical and Solid State Letters. 4(8), C58-C61.
Shin D-H, Woo S, Yem H, Cha M, Cho S, Kang M, Jeong S, Kim Y, Kang K, Piao Y. (2014) ACS Appl. Mater. Interfaces. 6, 3312.
Szeremeta J, Nyk M, Chyla A, Strek W, Samoc M. (2011) Optical Materials. 33, 1372-1376.
Tsai C-Y, Chang W-C, Chen G-L, Chung C-H, Liang J-X, Ma W-Y, Yang T-N. (2015) Nanoscale Research Letters. 10, 357.
Yabuki A, Tanaka S. (2012) Mater. Res. Bull. 47, 4107.
Yabuki A, Tachibana Y, Fathona Iw. (2014) Mater. Chem. & Phys. 148, 299.
Hokita Y, et al. (2015) ACS Appl. Mater. Interfaces. 7, 19382-19389.
Extended European Search Report dated May 4, 2020 on European application 17833137.7.

* cited by examiner

COPPER INK AND CONDUCTIVE SOLDERABLE COPPER TRACES PRODUCED THEREFROM

CROSS-REFERENCE TO RELATED APPLICATIONS

This application is a national entry of International Patent Application PCT/CA2017/050870 filed July 19,2017, and claims the benefit of United States Provisional Patent Application U.S. Ser. No. 62/367,810 filed Jul. 28, 2016, the entire contents of both of which are herein incorporated by reference.

FIELD

This application relates to inks, in particular to printable copper inks.

BACKGROUND

There is currently no additive process of which we are aware, which enables the formation of printed copper traces that can be directly soldered to using conventional lead-free solders. There are no copper inks on the market that provide the desired electrical properties, mechanical properties and solderability that end users seek.

The main causes of failure during lead-free soldering on copper traces are high sheet resistivity, poor adhesion strength and reduction in wettability caused by oxidation of the surface of the copper trace. Also, good wettability is limited due to heterogeneity (mixtures of copper metal and voids), high surface roughness and poor mechanical strength.

According to the state of the art, conductive thick films comprising silver-coated copper flakes, organic or inorganic binders (e.g. polymers, metal oxides) and proper wetting agents are used to obtain conductive copper traces amenable to soldering. A drawback of thick films with metal oxide binder is the requirement for higher processing temperatures, which are above 500° C. Thick films prepared from metal flakes and organic polymers are not always stable to soldering, and are generally difficult to lead-free solder at temperatures between 250° C. and 300° C.

Additionally, most copper inks are made from either flake/nanoparticles or metallo-organic compounds (MOD) and both of these types of inks have limitations. The main advantage of MOD inks over conventional flake/nanoparticle inks is that MOD compounds allow smooth films at low temperature sintering to provide small features. However, these inks are mixtures of metal salt and organic components, where the copper loading in the ink formulation is low and can result in lower electrical conductivities of printed traces. Also, the slow reactivity of copper traces to atmospheric oxygen (i.e. oxidation) results in a decrease in conductivity of traces over time.

U.S. Pat. No. 4,248,921 describes a paste composition for producing electrically conductive solderable structures for circuit boards and the like. The composition comprises a metal particle, a metal salt and a polymeric binder. The paste is preferably applied to a substrate by screen printing.

U.S. Pat. No. 7,211,205 describes a conductive ink composition comprising a reactive organic medium, metal powder and an adhesion promoting additive. The reactive organic medium may be a metallic-organic decomposition compound. The adhesion promoting additive may be a polymer. The metal powder may be copper metal.

There remains a need to increase electrical conductivity, mechanical strength and surface wettability as well as anti-oxidation properties of copper traces obtained from additive processes, such as printing, to enable direct solderability.

SUMMARY

In one aspect, there is provided an ink comprising an admixture of a copper nanoparticle, a copper precursor molecule, and a polymeric binder comprising a polyester, polyimide, polyether imide or any mixture thereof having surface functional groups that render the polymeric binder compatible with and/or soluble in a diol.

In another aspect, there is provided a process for producing a conductive solderable copper trace on a substrate, the process comprising depositing the ink on a substrate and sintering the ink on the substrate to produce a conductive solderable copper trace on the substrate.

In another aspect, there is provided a substrate comprising the conductive solderable copper trace produced by the process.

In another aspect, there is provided an electronic device comprising the substrate.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
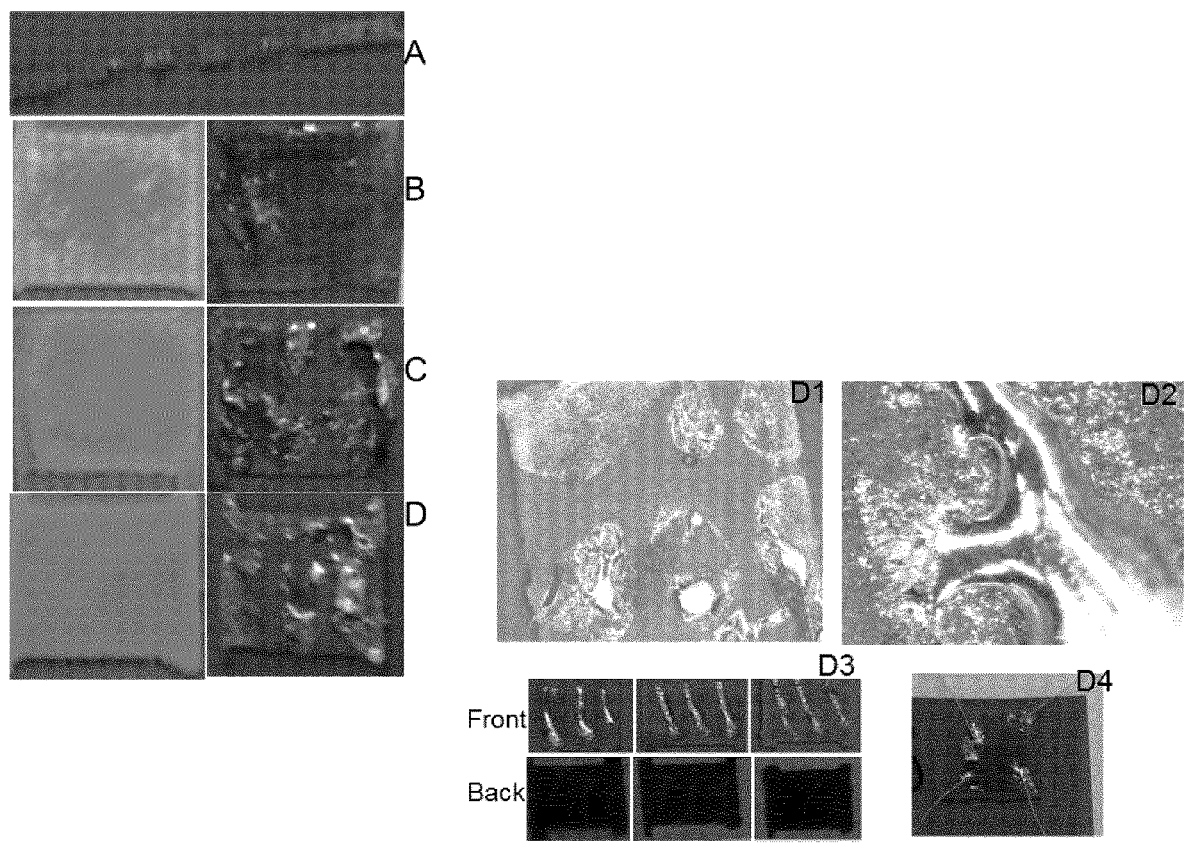
FIG. 1 depicts optical micrographs of copper traces before and after soldering formed from inks containing copper precursor molecule: A without copper nanoparticles and without polymer binder; B with 0.4 wt % copper nanoparticles and without polymer binder; C without copper nanoparticles and with 0.3 wt % Rokrapol™ 7075 polyester binder; and, D with 0.4 wt % copper nanoparticles and with 0.3 wt % Rokrapol™ 7075 polyester binder, all wt % based on total weight of the ink.

The ink comprises an admixture of a copper nanoparticle, a copper precursor molecule, and a polymeric binder comprising a polyester, polyimide, polyether imide or any mixture thereof having surface functional groups that render the polymeric binder compatible with and/or soluble in a diol.

Copper nanoparticles (CuNP) are copper particles having an average size along a longest dimension in a range of about 1-1000 nm, preferably about 1-500 nm, more preferably about 1-100 nm. The copper nanoparticles may be flakes, wires, needles, substantially spherical or any other shape. Copper nanoparticles can be formed by natural processes or through chemical synthesis, and are generally commercially available. The copper nanoparticles are preferably present in the ink in an amount of about 0.04-7 wt %, based on total weight of the ink. More preferably, the amount of copper nanoparticles is in a range of about 0.1-6 wt %, or about 0.25-5 wt %, or about 0.4-4 wt %, or about.

The copper precursor molecule is a copper-containing compound that decomposes under sintering conditions to produce further copper nanoparticles in the conductive copper trace. The copper precursor molecule may be an inorganic compound (e.g. $CuSO_4$, $CuCl_2$, $Cu(NO_3)$, $Cu(OH)_2$), a copper metallo-organic compound (copper-MOD) or a mixture thereof. Copper-MODs include, for example, copper carboxylates (e.g. copper salts of a $C_1$-$C_{12}$ alkanoic acid, such as copper formate, copper acetate, copper propanoate, copper butanoate, copper decanoate, copper neodecanoate and the like), copper amines (e.g. bis(2-ethyl-1-hexylamine) copper (II) formate, bis(octylamine) copper (II) formate, tris(octylamine) copper (II) formate and the like), copper ketone complexes (e.g. copper (acetylacetone), copper (trifluoroacetylacetone), copper (hexafluoroacetylacetone), copper (dipivaloylmethane) and the like), copper (II) hydroxide-alkanol amine complexes (e.g. $Cu(OH)_2$:ethanolamine, $Cu(OH)_2$:diethanolamine, $Cu(OH)_2$:triethanolamine and the like), copper (II) formate-alkanol amine complexes and copper:aminediol complexes (e.g. 3-diethylamino-1,2-propanediol (DEAPD), 3-(dimethylamino)-1,2 propanediol (DMAPD), 3-methylamino-1-2-propanediol (MPD), 3-amino-1,2-propanediol (APD), 3-morpholino-1, 2-propanediol and the like).

Copper:aminediol complexes are particularly preferred copper precursor molecules. Many copper:aminediol complexes are liquid at ambient temperature and are capable of acting as both copper precursor molecules and solvents. Further, copper:aminediol complexes interact favorably with the polymeric binder leading to superior conductive copper traces with respect to conductivity, mechanical strength and solderability. Particularly preferred copper: aminediol complexes are copper formate:aminediol complexes. In one embodiment, the copper:aminediol complex comprises a compound of Formula (I):

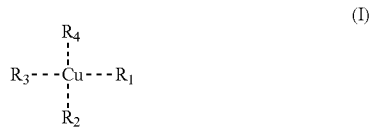

where $R_1$, $R_2$, $R_3$ and $R_4$ are the same or different and are $NR_5R_6(R'(OH)_2)$ or —O—(CO)—R", and at least one of $R_1$, $R_2$, $R_3$ or $R_4$ is $NR_5R_6(R'(OH)_2)$, wherein: $R_5$ and $R_6$ are independently H, $C_{1-8}$ straight chain, branched chain or cyclic alkyl, $C_{2-8}$ straight chain, branched chain or cyclic alkenyl, or $C_{2-8}$ straight chain, branched chain or cyclic alkynyl; R' is $C_{2-8}$ straight chain, branched chain or cyclic alkyl; and, R" is H or $C_{1-8}$ straight chain, branched chain or cyclic alkyl.

In the compound of Formula (I), $NR_5R_6(R'(OH)_2)$ is coordinated to the copper atom through the nitrogen atom of the $NR_5R_6(R'(OH)_2)$. On the other hand, —O—(CO)—R" is covalently bonded to the copper atom through the oxygen atom. Preferably, one or two of $R_1$, $R_2$, $R_3$ or $R_4$ are $NR_5R_6(R'(OH)_2)$, more preferably two of $R_1$, $R_2$, $R_3$ or $R_4$ are $NR_5R_6(R'(OH)_2)$.

Preferably, $R_5$ and $R_6$ are independently H or $C_{1-8}$ straight chain branched chain or cyclic alkyl, more preferably H or $C_{1-8}$ straight chain or branched chain alkyl, yet more preferably H or $C_{1-4}$ straight chain or branched chain alkyl. Examples of $C_{1-4}$ straight chain or branched chain alkyl are methyl, ethyl, n-propyl, i-propyl, n-butyl, s-butyl and t-butyl. In a particularly preferred embodiment, $R_5$ and $R_6$ are H, methyl or ethyl.

Preferably R' is $C_{2-8}$ straight chain or branched chain alkyl, more preferably $C_{2-5}$ straight or branched chain alkyl. R' is preferably a straight chain alkyl. In a particularly preferred embodiment, R' is propyl. On a given R' substituent, the OH groups are preferably not bonded to the same carbon atom.

Preferably R" is H or $C_{1-4}$ straight chain alkyl, more preferably H.

The copper precursor compound provides the balance of the weight of the ink after accounting for the copper nanoparticles, polymeric binder and any other inclusions in the ink. The copper precursor compound is preferably present in the ink in an amount of about 35 wt % or more, based on total weight of the ink. The amount of copper precursor compound may be about 45 wt % or more, or about 50 wt % or more, or about 55 wt % or more, or about 60 wt % or more, or about 65 wt % or more, or about 70 wt % or more, or about 75 wt % or more, or about 80 wt % or more, or about 84 wt % or more. In one embodiment, the amount of copper precursor is about 84 wt %.

The polymeric binder comprises a polyester, polyimide, polyether imide or any mixture thereof having surface functional groups that render the polymeric binder compatible with and/or soluble in a diol. Preferably, the surface functional groups comprise polar groups capable of participating in hydrogen bonding. The surface functional groups preferably comprise one or more of hydroxyl, carboxyl, amino and sulfonyl groups. The polymeric binder may be present in the ink in any suitable amount. Preferably, the polymeric binder is present in the ink in an amount of about 0.04-0.8 wt %, based on total weight of the ink. More preferably, the amount of polymeric binder is in a range of about 0.08-0.6 wt %, even more preferably about 0.25-1 wt %, yet even more preferably about 0.25-0.4 wt %, for example about 0.3 wt %.

The polymeric binder preferably comprises a polyester. Suitable polyesters are commercially available or may be manufactured by the condensation of poly alcohols with poly carboxylic acid and respectively their anhydrides. Preferred polyesters are hydroxyl and/or carboxyl functionalized. The polyester may be linear or branched. Solid or liquid polyesters as well as diverse solution forms may be utilized. In a particularly preferred embodiment, the polymeric binder comprises a hydroxyl- and/or carboxyl-terminated polyester, for example Rokrapol™ 7075.

The polymeric binders described herein, especially surface functionalized polyesters, provide good solubility in diols and good mechanical strength in comparison to other polymeric binders like hydroxycellulose, polyphenol and polyvinylpyrrolidone. The polymeric binders described herein are thus particularly useful in conjunction with copper:aminediol complexes when copper:aminediol complexes are utilized as the copper precursor compound and a solvent. The interaction between the polymeric binder specified herein and copper:aminediol complexes together with the copper nanoparticles leads to conductive copper traces having particularly improved conductivity, mechanical strength and solderability.

In a particularly preferred embodiment, a screen printable copper ink comprising copper nanoparticles, a copper formate:aminediol complex and a hydroxyl- and/or carboxyl-terminated polyester binder provides conductive copper traces having particularly improved conductivity, mechanical strength and solderability. The copper formate:aminediol complex also provides robustness to enable sintering in the presence of up to 500 ppm oxygen. The resultant sintered conductive copper traces have improved air stability and greater stability towards lead-free soldering.

The ink may be formulated by mixing the copper nanoparticles, copper precursor molecule and polymeric binder together. Mixing may be performed with or without an additional solvent. Preferably, the copper precursor molecule is a liquid and can act as a solvent in addition to being a precursor to copper metal formation. However, in some embodiments an additional solvent may be desired. The additional solvent may comprise at least one aqueous solvent, at least one aromatic organic solvent, at least one non-aromatic organic solvent or any mixture thereof, for example water, toluene, xylene, anisole, diethylbenzene, alcohols (e.g. methanol, ethanol), diols (e.g. ethylene glycol), triols (e.g. glycerol) or any mixture thereof. Additional solvent may comprise about 0.5-50 wt % of the ink, based on total weight of the ink, more preferably about 1-20 wt %.

In a preferred embodiment, the copper precursor molecule is a copper:aminediol complex in the form of a liquid. As such, the copper:aminediol complex acts as the solvent as well as the copper precursor molecule. As discussed previously, the use of the copper:aminediol complex as both the copper precursor molecule and the solvent is particularly favorable because the interaction between the polymeric binder and copper:aminediol complexes leads to particularly improved conductive copper traces. However, in some embodiments it may still be desirable to add additional solvent, for example a diol or triol to the ink. Additional diol or triol may comprise, for example, methanediol, ethylene glycol, propane-1,2-diol, propane-1,3-diol, glycerol or any mixture thereof. Glycerol is preferred when an additional solvent is desired. The amount of diol or triol used in addition to the copper:aminediol complex is preferably in a range of about 0.1-5 wt %, based on total weight of the ink, more preferably about 0.5-3 wt %, for example about 1.25 wt %.

While the ink may be formulated for any kind of depositing, the ink is particularly suited for screen printing. In this regard, the ink preferably has a viscosity of about 1,500 cP or greater, more preferably about 1,500-10,000 cP or 4,000-8,000 cP, for example about 6,000 cP.

The ink may be deposited, for example printed, onto a substrate to form a trace of the ink on the substrate. Drying the ink and decomposing copper precursor molecules within the trace to form conductive solderable copper traces may be accomplished by any suitable technique, where the techniques and conditions are guided by the type of substrate on which the traces are deposited. For example, drying the ink and decomposing copper precursor molecules may be accomplished by heating and/or photonic sintering.

In one technique, heating the substrate dries and sinters the trace to form a conductive copper trace. Sintering decomposes the copper precursor molecule to form conductive nanoparticles of the copper, which are present in the copper trace in addition to the copper nanoparticles that were present in the original ink. Heating is preferably performed at a temperature in a range of about 110-250° C., for example about 130-230° C. Heating is preferably performed for a time of about 2 hours or less, more preferably about 15 minutes or less, for example a time in a range of about 1-15 minutes, or about 2-15 minutes, in particular about 3-10 minutes. Heating is performed at a sufficient balance between temperature and time to sinter the trace on the substrate to form the conductive copper trace. The type of heating apparatus also factors into the temperature and time required for sintering. Sintering may be performed with the substrate under an inert atmosphere (e.g. nitrogen and/or argon gas) or a reducing atmosphere (e.g. hydrogen gas). However, it is particularly noteworthy that the copper-based ink of the present invention is more robust to the presence of an oxidant than comparative copper-based inks, and may therefore be sintered in the presence of an oxidizing agent (e.g. air and/or oxygen gas). In one embodiment, the oxygen content of the sintering atmosphere may be up to about 500 ppm. In addition, the sintered copper traces exhibit improved air stability.

In another technique, a photonic sintering system may feature a high intensity lamp (e.g. a pulsed xenon lamp) that delivers a broadband spectrum of light. The lamp may deliver about 5-20 J/cm$^2$ in energy to the traces. Pulse widths are preferably in a range of about 0.58-1.5 ms. Driving voltages are preferably in a range of about 2.0-2.8 kV. Photonic sintering may be performed under ambient conditions (e.g. in air). Photonic sintering may be performed using milder conditions when compared to copper inks that include copper organic compounds but do not include copper nanoparticles. Photonic sintering is especially suited for, but not limited to, polyethylene terephthalate and polyimide substrates.

The ink may be deposited on a substrate by any suitable method, for example printing. Printing includes, for example, screen printing, inkjet printing, flexography printing (e.g. stamps), gravure printing, off-set printing, airbrushing, aerosol printing, typesetting, or any other method. After deposition, the ink may be dried and/or sintered, for example by allowing the ink to dry in ambient conditions and/or heating the ink for an appropriately long period of time. The ink of the present invention is particularly suited to screen printing. By adjusting the viscosity of the ink appropriately, the ink may be used in other printing methods.

The substrate may be any suitable surface, especially any printable surface. Printable surfaces may include, for example polyethylene terephthalate (PET) (e.g. Melinex™), polyolefin (e.g. silica-filled polyolefin (Teslin™)), polydimethylsiloxane (PDMS), polystyrene, polycarbonate, polyether imide (e.g. Ultem™), polyimide (e.g. Kapton™), silicone membranes, printed wiring board substrate (e.g. woven fiberglass cloth with an epoxy resin binder (FR4)), textiles (e.g. cellulosic textiles), thermoplastic polyurethanes (TPU), paper, glass, metal, dielectric coatings, among others. Flexible substrates are preferred. The substrate preferably comprises polyethylene terephthalate (PET) or polyimide.

The conductive copper trace produced from the ink of the present invention preferably has a sheet resistivity of about 250 mOhm/sq/mil or less, more preferably about 100 mOhm/sq/mil or less, even more preferably about 80 mOhm/sq/mil or less, even more preferably about 65 mOhm/sq/mil or less, yet even more preferably about 35 mOhm/sq/mil or less. Sheet resistivity of conductive copper traces produced from inks of the present invention may be 10% or more lower than sheet resistivity of conductive copper traces produced from comparable prior inks. In some cases, the sheet resistivity may be 15% or more lower, or even 20% or more lower.

Conductive copper traces produced from the ink of the present invention perform well in standard ASTM bend and crease tests (ASTM F1683-02) for flexibility while maintaining high conductivity. In an optimal embodiment, the conductive trace can maintain resistivity (conductivity) with a change of about 15% or less, preferably about 10% or less, more preferably about 5% or less, even more preferably about 3% or less, after 10 compressive flex or 10 tensile flex cycles according to ASTM Test F1683-02. In another optimal embodiment, the conductive trace can maintain resistivity (conductivity) with a change of about 20% or less, preferably about 15% or less, more preferably about 10% or less, yet more preferably about 5% or less, after 1 compressive or 1 tensile crease cycle according to ASTM Test F1683-02.

The conductive copper trace preferably has a thickness of about 4 microns or less, preferably about 2 microns or less. The conductive copper trace preferably has a nominal line width of about 2 mil or more, more preferably about 3 mil or more, even more preferably about 5 mil or more. Preferably, the nominal line width is about 20 mil or less. There may be a trade-off between line thickness/width and sheet resistivity/mechanical strength/solderability. Thinner and/or narrower copper traces may in some cases lead to higher sheet resistivity, poorer mechanical strength and/or poorer solderability.

Generally, for a given line thickness/width, a conductive copper trace produced from an ink of the present invention has lower sheet resistivity, better mechanical strength and/or better solderability than a conductive copper trace produced from a comparative ink. In one embodiment, a sheet resistivity in a range of about 20-30 mOhm/sq/mil can be obtained for screen printed conductive copper traces having a nominal line width in a range of about 5-20 mil with excellent resolution.

The substrate, having the conductive solderable copper trace thereon, may be incorporated into an electronic device, for example electrical circuits, conductive bus bars (e.g. for photovoltaic cells), sensors (e.g. touch sensors, sensor arrays), antennae (e.g. RFID antennae), thin film transistors, diodes, and smart packaging (e.g. smart drug packaging).

The sintered copper trace is both conductive and solderable. The copper trace may be both electrically and thermally conductive. For use in electronic applications the copper trace is desirably at least electrically conductive. The sintered copper trace is advantageously directly solderable without the use of lead-containing solders to form electrical connections between electronic components on the substrate. It is thought that the copper trace may be soldered with lead-free solder due, at least in part, to excellent wettability. The soldered copper trace has better adhesion strength and comparable or better conductivity in comparison to copper traces formed from comparative copper inks. Further, the present copper-based ink not only may increase conductivity of the sintered copper trace, but also surprisingly may lead to superior resistance to oxidation. Thus, the present copper-based ink may unexpectedly provide conductive copper traces having both direct solderabilty and longer term shelf stability, with increased conductivity and mechanical strength.

EXAMPLES

Example 1: Effect of Copper Nanoparticles (CuNP) on Conductivity of Copper (Cu) Traces Prepared from an Ink Formulated with CuF:DEAPD and Rokrapol™ 7075 Binder Molecular inks were formulated by mixing 0 wt % or 0.4 wt % CuNP (TEKNA™ from Advanced Material Inc.) and 0.3 wt % of a carboxyl-terminated polyester binder (Rokrapol™ 7075 from Kramer) in CuF:DEAPD (1:1 mol eq Cu:DEAPD), and including 3 mol eq. water ($H_2O$) (based on moles CuF:DEAPD) and 1.25 wt % glycerol as additional solvents. The CuF:DEAPD was formed from Cu formate hydrate (STREM Chemicals, Inc.) and 3-(diethylamino)-1-2-propanediol (Aldrich). The ink was screen printed on to a Kapton™ film to produce ink traces of the same length (10 cm) and various nominal line widths as shown in Table 1 and Table 2. The ink traces were sintered at 110° C. for 30 min, then 210° C. for 5 min, then 230° C. for 5 min (substrate temperature) under a nitrogen gas atmosphere containing 500 ppm oxygen gas.

TABLE 1

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | 4.19 | 1.10 | 106.43 | 0.98 | 10800 | 11.49 | 307.71 | 781 |
| 3 | 6.85 | 1.93 | 173.99 | 0.65 | 3420 | 5.95 | 152.28 | 386 |
| 5 | 7.40 | 1.20 | 187.96 | 0.96 | 1500 | 2.82 | 106.56 | 270 |
| 10 | 10.91 | 0.46 | 277.11 | 1.20 | 667 | 1.85 | 87.32 | 221 |
| 15 | 12.32 | −1.34 | 312.93 | 1.20 | 562 | 1.76 | 83.09 | 211 |
| 20 | 17.07 | −1.47 | 433.58 | 1.10 | 434 | 1.88 | 81.49 | 206 |

0 wt % CuNP

TABLE 2

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | 3.09 | 0.55 | 78.49 | 0.35 | 8000 | 6.28 | 86.52 | 219 |
| 3 | 4.10 | 0.55 | 104.14 | 0.65 | 2100 | 2.19 | 55.97 | 142 |
| 5 | 6.02 | 0.51 | 152.91 | 1.00 | 963 | 1.47 | 57.97 | 147 |
| 10 | 10.80 | 0.40 | 274.32 | 1.25 | 421 | 1.15 | 56.84 | 144 |
| 15 | 15.40 | 0.20 | 391.16 | 1.20 | 322 | 1.26 | 59.51 | 151 |
| 20 | 20.09 | 0.04 | 510.29 | 1.20 | 245 | 1.25 | 59.06 | 150 |

0.4 wt % CuNP

It is apparent from Table 1 and Table 2 that an ink formulated with a combination of copper(II) formate anhydrate:3-diethylamino-1,2-propanediol (CuF:DEAPD), copper nanoparticles (CuNP) and Rokrapol™ 7075 polyester binder provides screen printed copper traces with excellent line resolution and high conductivity (low resistivity).

Example 2: Effect of Copper Nanoparticle (CuNP) Loading in an Ink Formulated with Copper(II) Formate Anhydrate:3-Diethylamino-1,2-Propanediol (CuF:DEAPD)

A molecular ink was formulated by mixing 0, 0.4, 0.8 or 4.1 wt % copper nanoparticles, based on total weight of ink, in CuF:DEAPD (1:1 mol eq Cu:DEAPD), and including 2.5 mol eq. water ($H_2O$) (based on moles CuF:DEAPD) and 1.25 wt % glycerol as additional solvents. The ink was printed on to a Kapton™ film using a tape mask technique to produce ink traces of the same length (10 cm) with nominal line widths in a range of about 20-40 mil. The ink traces were sintered at 130° C. for 5 min, then 190° C. for 5 min, then 210° C. for 5 min (substrate temperature) under a nitrogen gas atmosphere containing 500 ppm oxygen gas. It is apparent from Table 3 that the addition of copper nanoparticles increases the conductivity (decreases resistivity) of the sintered copper traces at relatively low loadings. Further, as the loading of copper nanoparticles increases to about 4.1 wt %, the copper traces adhered poorly to the substrate, indicating the need for a binder.

TABLE 3

| CuNP (wt %) | Resistance (Ω) |
| --- | --- |
| 0 | 43-49 |
| 0.4 | 13-17 |
| 0.8 | 17-19 |
| 4.1 | 47-67 |

Example 3: Effect of Copper Nanoparticles (CuNP) on Conductivity of Cu Traces Prepared from an Ink Formulated with CuF:DEAPD and Screen Printed on Different Substrates On Kapton™

Molecular inks were formulated by mixing 0 wt %, 0.4 wt % or 0.6 wt % copper nanoparticles in CuF:DEAPD (1:1 mol eq Cu:DEAPD), and including 2.5 or 3 mol eq. water ($H_2O$) (based on moles CuF:DEAPD) and 1.25 wt % glycerol as additional solvents. The inks were screen printed on to a Kapton™ film to produce ink traces of the same length (10 cm) and various nominal line widths as shown in Table 4, Table 5, Table 6, Table 7 and Table 8. The ink traces were sintered at 130° C. for 3 min or 30 min, then 190° C. or 210° C. for 5 min, then 230° C. for 5 min (substrate temperature) under a nitrogen gas atmosphere containing 500 ppm oxygen gas.

TABLE 4

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
| --- | --- | --- | --- | --- | --- | --- | --- | --- |
| 2 | | | | | | | | |
| 3 | | | | | | | | |
| 5 | | | | | | | | |
| 10 | | | | | | | | |
| 15 | 17.00 | 1.00 | 431.80 | 1.44 | 450 | 1.94 | 110.16 | 280 |
| 20 | 20.36 | 0.18 | 517.14 | 1.75 | 228 | 1.18 | 81.24 | 206 |

0 wt % CuNP, 2.5 eq $H_2O$, 130° C. for 3 min then 210° C. for 5 min then 230° C. for 5 min

TABLE 5

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
| --- | --- | --- | --- | --- | --- | --- | --- | --- |
| 2 | | | | | | | | |
| 3 | | | | | | | | |
| 5 | 6.24 | 0.62 | 158.50 | 0.79 | 650 | 1.03 | 32.04 | 81 |
| 10 | 11.46 | 0.73 | 291.08 | 1.70 | 160 | 0.47 | 31.17 | 79 |
| 15 | 16.21 | 0.61 | 411.73 | 1.85 | 89 | 0.37 | 26.69 | 67 |
| 20 | 20.80 | 0.40 | 528.32 | 1.85 | 59 | 0.31 | 22.70 | 57 |

0.6 wt % CuNP, 2.5 eq $H_2O$, 130° C. for 3 min then 210° C. for 5 min then 230° C. for 5 min Addition of copper nanoparticles to the ink helps produce screen printed high resolution copper traces with increased conductivity as shown in Table 4 and Table 5. Also, addition of copper nanoparticles showed enhanced oxidation resistance for sintered copper traces as a function of time. Inks without copper nanoparticles suffered from a 200% increase in resistivity in one month; while inks with copper nanoparticles had a 20% increase in resistivity over one month.

TABLE 6

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | | | | | | | | |
| 3 | | | | | | | | |
| 5 | 6.05 | 0.53 | 153.67 | 0.90 | 3400 | 5.22 | 185.13 | 470 |
| 10 | 10.57 | 0.29 | 268.48 | 1.39 | 203 | 0.55 | 29.83 | 75 |
| 15 | 15.46 | 0.23 | 392.68 | 1.40 | 132 | 0.52 | 28.57 | 72 |
| 20 | 20.76 | 0.38 | 527.30 | 1.40 | 104 | 0.55 | 30.23 | 76 |

0.4 wt % CuNP, 3 eq $H_2O$, 130° C. for 3 min then 210° C. for 5 min then 230° C. for 5 min

TABLE 7

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | 3.20 | 0.60 | 81.28 | 0.55 | 14000 | 11.38 | 246.40 | 625 |
| 3 | 3.72 | 0.36 | 94.49 | 0.67 | 4000 | 3.78 | 99.70 | 253 |
| 5 | 5.98 | 0.49 | 151.89 | 0.90 | 980 | 1.49 | 52.74 | 133 |
| 10 | 10.72 | 0.36 | 272.29 | 1.50 | 314 | 0.85 | 50.49 | 128 |
| 15 | 14.90 | −0.05 | 378.46 | 1.70 | 180 | 0.68 | 45.59 | 115 |
| 20 | 19.48 | −0.26 | 494.79 | 1.76 | 103 | 0.51 | 35.31 | 89 |

0.4 wt % CuNP, 3 eq $H_2O$, 130° C. for 30 min then 210° C. for 5 min then 230° C. for 5 min

TABLE 8

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | 2.70 | 0.35 | 68.58 | 0.45 | 4000 | 2.74 | 48.60 | 123 |
| 3 | 4.20 | 0.60 | 106.68 | 0.55 | 1700 | 1.81 | 39.27 | 99 |
| 5 | 6.09 | 0.54 | 154.56 | 0.91 | 872 | 1.35 | 48.29 | 122 |
| 10 | 10.47 | 0.24 | 265.94 | 1.43 | 267 | 0.71 | 39.98 | 101 |
| 15 | 15.89 | 0.45 | 403.61 | 1.70 | 144 | 0.58 | 38.90 | 98 |
| 20 | 20.70 | 0.35 | 525.78 | 1.36 | 115 | 0.60 | 32.37 | 82 |

0.4 wt % CuNP, 3 eq $H_2O$, 130° C. for 30 min then 190° C. for 5 min then 230° C. for 5 min It is evident from Table 6, Table 7 and Table 8 that sintering conditions may be optimized to provide sintered copper traces on Kapton™ having excellent resolution and even higher conductivity for lines having nominal widths in a range of 2-20 mil.

On Melinex™

Similar experiments were conducted with Melinex™ as the substrate rather than Kapton™. Melinex™ is a low temperature substrate, therefore the sintering conditions were milder. Thus, molecular inks were formulated by mixing 0 wt % or 0.4 wt % copper nanoparticles in CuF:DEAPD (1:1 mol eq Cu:DEAPD), and including 2.5 mol eq. water ($H_2O$) (based on moles CuF:DEAPD) and 1.25 wt % glycerol as additional solvents. The inks were screen printed on to a Melinex™ film to produce ink traces of the same length (10 cm) and various nominal line widths as shown in Table 9 and Table 10. The ink traces were sintered at 130° C. for 60 min, then 145° C. for 10 min (substrate temperature) under a nitrogen gas atmosphere containing 500 ppm oxygen gas.

TABLE 9

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | 3.4 | 0.69 | 86 | 0.68 | 6400 | 5.50 | 147 | 374 |
| 3 | 3.8 | 0.39 | 96 | 1.10 | 2400 | 2.30 | 99 | 253 |
| 5 | 6.3 | 0.67 | 161 | 1.10 | 1300 | 2.09 | 91 | 230 |
| 10 | 11.3 | 0.65 | 287 | 1.30 | 946 | 2.72 | 139 | 352 |
| 15 | 15.8 | 0.39 | 401 | 1.40 | 540 | 2.17 | 119 | 303 |
| 20 | 20.7 | 0.35 | 526 | 1.38 | 476 | 2.50 | 136 | 345 |

0 wt % CuNP

TABLE 10

| nominal linewidth (mil) | measured linewidth (mil) | Δ (mil) | measured linewidth (μm) | line thickness (μm) | Ω | Ω/☐ | sheet resistivity (m Ω/☐/mil) | volume resistivity (μΩ · cm) |
|---|---|---|---|---|---|---|---|---|
| 2 | | | | | | | | |
| 3 | 4.00 | 0.50 | 101.60 | 0.80 | 5100 | 5.18 | 163.20 | 414 |
| 5 | 6.10 | 0.55 | 154.94 | 1.00 | 1800 | 2.79 | 109.80 | 278 |
| 10 | 10.36 | 0.18 | 263.14 | 1.60 | 390 | 1.03 | 64.65 | 164 |
| 15 | 13.51 | −0.75 | 343.15 | 1.50 | 227 | 0.78 | 46.00 | 116 |
| 20 | 18.21 | −0.90 | 462.53 | 1.80 | 160 | 0.74 | 52.44 | 133 |

0.4 wt % CuNP

It is evident from Table 9 and Table 10 that conducting traces may be screen printed on Melinex™ with good resolution, and that the addition of copper nanoparticles increases conductivity.

Example 4: Effect of Photosintering on Screen Printed Cu Traces Prepared from an Ink Formulated with CuF:DEAPD with and without Copper Nanoparticle (CuNP) and Rokrapol™ 7075 Binder Molecular inks were formulated by mixing 0 wt % or 0.4 wt % copper nanoparticles and 0 wt % or 0.3 wt % of a carboxyl-terminated polyester binder (Rokrapol™ 7075) in CuF:DEAPD (1:1 mol eq Cu:DEAPD), and including 3 mol eq. water ($H_2O$) (based on moles CuF:DEAPD) and 1.25 wt % glycerol as additional solvents. The ink was screen printed on to a Kapton™ film to produce ink traces of the same length (10 cm) and various nominal line widths as shown in Table 11, Table 12 and Table 13. The ink traces were photosintered in air at 2.6 eV or 2.4 eV at PFN2. PFN2 is pulse width, pulse forming network stage 2. There are four PFN stages, connection to these different stages allowing configuration of different pulse duration and energy per pulse.

TABLE 11

| nominal linewidth (mil) | measured linewidth (mil) | Δ (mil) | measured linewidth (μm) | line thickness (μm) | Ω | Ω/☐ | sheet resistivity (m Ω/☐/mil) | volume resistivity (μΩ · cm) |
|---|---|---|---|---|---|---|---|---|
| 2 | 6.69 | 2.35 | 170 | 0.17 | 7130 | 12.12 | 81.12 | 206 |
| 3 | 8.27 | 2.63 | 210 | 0.14 | 5325 | 11.18 | 61.64 | 156 |
| 5 | 10.63 | 2.81 | 270 | 0.08 | 2184 | 5.90 | 18.57 | 47 |
| 10 | 14.17 | 2.09 | 360 | 0.42 | 724 | 2.61 | 42.58 | 108 |
| 15 | 18.50 | 1.75 | 470 | 0.38 | 472 | 2.22 | 32.74 | 83 |
| 20 | 20.47 | 0.24 | 520 | 0.49 | 386 | 2.01 | 38.69 | 98 |

0 wt % CuNP, 0 wt % Rokrapol ™ 7075, 2.5 eV

TABLE 12

| nominal linewidth (mil) | measured linewidth (mil) | Δ (mil) | measured linewidth (μm) | line thickness (μm) | Ω | Ω/☐ | sheet resistivity (m Ω/☐/mil) | volume resistivity (μΩ · cm) |
|---|---|---|---|---|---|---|---|---|
| 2 | 6.69 | 2.35 | 170 | 0.11 | 3665 | 6.23 | 25.76 | 65 |
| 3 | 7.87 | 2.44 | 200 | 0.06 | 4162 | 8.32 | 18.02 | 45 |
| 5 | 10.24 | 2.62 | 260 | 0.25 | 2126 | 5.53 | 54.41 | 138 |
| 10 | 15.35 | 2.68 | 390 | 0.32 | 811 | 3.16 | 39.22 | 99 |
| 15 | 16.54 | 0.77 | 420 | 0.38 | 517 | 2.17 | 32.50 | 82 |
| 20 | 20.08 | 0.04 | 510 | 0.47 | 333 | 1.70 | 31.17 | 79 |

0 wt % CuNP, 0 wt % Rokrapol ™ 7075, 2.6 eV

TABLE 13

| nominal linewidth (mil) | measured linewidth (mil) | Δ (mil) | measured linewidth (μm) | line thickness (μm) | Ω | Ω/☐ | sheet resistivity (m Ω/☐/mil) | volume resistivity (μΩ · cm) |
|---|---|---|---|---|---|---|---|---|
| 2 | 5.12 | 1.56 | 130 | 0.26 | 3840 | 4.99 | 50.12 | 127 |
| 3 | 7.48 | 2.24 | 190 | 0.21 | 2140 | 4.07 | 33.62 | 85 |
| 5 | 11.81 | 3.41 | 300 | 0.32 | 821 | 2.46 | 31.03 | 78 |
| 10 | 16.14 | 3.07 | 410 | 0.51 | 381 | 1.56 | 31.06 | 78 |
| 15 | 18.70 | 1.85 | 475 | 0.59 | 263 | 1.25 | 29.02 | 73 |
| 20 | 21.85 | 0.93 | 555 | 0.56 | 224 | 1.24 | 27.16 | 68 |

0.4 wt % CuNP, 3.75 wt % Rokrapol ™ 7075, 2.4 eV

TABLE 14

| nominal linewidth (mil) | measured linewidth (mil) | Δ (mil) | measured linewidth (μm) | line thickness (μm) | Ω | Ω/□ | sheet resistivity (m Ω/□/mil) | volume resistivity (μΩ · cm) |
|---|---|---|---|---|---|---|---|---|
| 2 | 6.10 | 2.05 | 155 | 0.26 | 2100 | 3.26 | 33.32 | 84 |
| 3 | 7.68 | 2.34 | 195 | 0.27 | 1286 | 2.51 | 26.66 | 67 |
| 5 | 11.22 | 3.11 | 285 | 0.29 | 538 | 1.53 | 17.51 | 44 |
| 10 | 16.34 | 3.17 | 415 | 0.54 | 246 | 1.02 | 21.70 | 55 |
| 15 | 16.50 | 0.75 | 419 | 0.66 | 181 | 0.76 | 19.56 | 49 |
| 20 | 23.23 | 1.61 | 590 | 0.93 | 138 | 0.81 | 29.81 | 75 |

0.6 wt % CuNP, 3.75 wt % Rokrapol™ 7075, 2.4 eV

It is apparent from Table 11 to Table 14 that the resistance of Cu traces decreases significantly with addition of copper nanoparticles and also traces can be sintered at milder photosintering condition.

Example 5: Mechanical Properties of Screen Printed Copper Traces Prepared from Inks Molecular inks were formulated by mixing 0.6 wt % copper nanoparticles and 0.3 wt % of a carboxyl-terminated polyester binder (Rokrapol™ 7075) in CuF:DEAPD (1:1 mol eq Cu:DEAPD), and including 3 mol eq. water ($H_2O$) (based on moles CuF:DEAPD) and 1.25 wt % glycerol as additional solvents. The ink was screen printed on to a Kapton™ film to produce ink traces of the same length (10 cm) and various nominal line widths as shown in Table 15 and Table 16. The ink traces in Table 15 were photosintered in air at 2.4 eV at PFN2. The ink traces in Table 16 were thermally sintered at 110° C. for 30 min, then 210° C. for 5 min, and then 230° C. for 5 min (substrate temperature) under a nitrogen gas atmosphere containing 500 ppm oxygen gas. Table 15 and Table 16 provide mechanical properties of photosintered copper traces and thermally sintered copper traces, respectively.

It is apparent from Table 15 that photosintered copper traces made with CuNP, CuF:DEAPD and polyester binder pass all mechanical tests, maintaining resistivity (R) within acceptable limits without physical break of the trace, i.e. without open fails. As shown in Table 16, thermally sintered copper traces having nominal line widths from 20 mil to 3 mil pass all mechanical tests, except for tensile flex, maintaining resistivity (R) within acceptable limits without open fails. Thermally sintered copper traces having nominally 2 mil line widths failed all the mechanical tests, indicating that photosintering is a preferable sintering method for copper traces having nominal line widths below 3 mil.

TABLE 15

| ASTM F1683-02 | | Nominal line widths | | | | | |
|---|---|---|---|---|---|---|---|
| | | 2 mil | 3 mil | 5 mil | 10 mil | 15 mil | 20 mil |
| Tensile flex | % change in R | 10.5 | 9.0 ± 1.6 | 9.4 ± 1.2 | 9.6 ± 0.9 | 8.6 ± 1.2 | 7.7 ± 1.8 |
| | open fails | 0/1 | 0/5 | 0/5 | 0/5 | 0/5 | 0/5 |
| Compressive flex | % change in R | 0.9 | 2.9 ± 0.4 | 2.4 ± 0.3 | 4.5 ± 0.8 | 3.5 ± 0.8 | 3 ± 1.2 |
| | open fails | 0/1 | 0/5 | 0/5 | 0/5 | 0/5 | 0/5 |
| Tensile crease | % change in R | 3.6 | 5.7 ± 0.7 | 4.1 ± 2 | 4.3 ± 1 | 4.1 ± 1.4 | 4.5 ± 1 |
| | open fails | 0/1 | 0/5 | 0/5 | 0/5 | 0/5 | 0/5 |
| Compressive crease | % change in R | 4.95 | 2.9 ± 1.3 | 1.7 ± 1.6 | 1.1 ± 0.3 | 1 ± 0.3 | 1.7 ± 1.2 |
| | open fails | 0/1 | 0/5 | 0/5 | 0/5 | 0/5 | 0/5 |

0.6 wt % CuNP, 3.75 wt % Rokrapol™ 7075

TABLE 16

| ASTM F1683-02 | | Nominal line widths | | | | | |
|---|---|---|---|---|---|---|---|
| | | 2 mil | 3 mil | 5 mil | 10 mil | 15 mil | 20 mil |
| Tensile flex | % change in R | F | 91 ± 26 | 81 ± 16 | 91 ± 7 | 99 ± 11 | 100 ± 2 |
| | open fails | 5/5 | 0/5 | 0/5 | 0/5 | 0/5 | 0/5 |
| Compressive flex | % change in R | F | 2.7 ± 7 | 1.5 ± 5 | 1.5 ± 6 | 1.4 ± 7 | 1.1 ± 6 |
| | open fails | 5/5 | 0/5 | 0/5 | 0/5 | 0/5 | 0/5 |
| Tensile crease | % change in R | F | 11 ± 13 | 15 ± 2 | 18 ± 3 | 17 ± 5 | 16 ± 6 |
| | open fails | 5/5 | 0/5 | 0/5 | 0/5 | 0/5 | 0/5 |
| Compressive crease | % change in R | F | 9 ± 1.3 | 19 ± 3 | 16 ± 0.6 | 20 ± 3 | 20 ± 4 |
| | open fails | 5/5 | 0/5 | 0/5 | 0/5 | 0/5 | 0/5 |

0.6 wt % CuNP, 3.75 wt % Rokrapol™ 7075

Photosintered traces prepared using inks with/without copper nanoparticles and without binder (Rokrapol™ 7075) failed all ASTM standard mechanical tests. However, addition of binder in an ink without nanoparticles passed ASTM standard mechanical tests as shown in Table 17. These results suggest that the inclusion of the binder provides good mechanical properties.

TABLE 17

| ASTM F1683-02 | | Nominal line widths | | | | | |
|---|---|---|---|---|---|---|---|
| | | 2 mil | 3 mil | 5 mil | 10 mil | 15 mil | 20 mil |
| Tensile flex | % change in R | 13.9 ± 4 | 14.3 ± 4 | 16.4 ± 2 | 14.7 ± 4 | 14.3 ± 2 | 16.4 ± 5 |
| | open fails | 1/3 | 1/3 | 0/3 | 0/3 | 0/3 | 0/3 |
| Compressive flex | % change in R | 2.8 ± 5 | 5.5 ± 6 | 5.9 ± 7 | 7.7 ± 6 | 8.0 ± 4 | 8.2 ± 5 |
| | open fails | 1/3 | 1/3 | 0/3 | 0/3 | 0/3 | 0/3 |
| Tensile crease | % change in R | 7.8 ± 5 | 7.7 ± 6 | 3.4 ± 7 | 4.0 ± 6 | 7.7 ± 4 | 8.2 ± 5 |
| | open fails | 1/3 | 1/3 | 0/3 | 0/3 | 0/3 | 0/3 |
| Compressive crease | % change in R | 7.9 ± 8 | 1.6 ± 6 | 2.7 ± 6 | 4.2 ± 7 | 3.7 ± 3 | 4.4 ± 5 |
| | open fails | 1/3 | 1/3 | 0/3 | 0/3 | 0/3 | 0/3 |

0.0 wt % CuNP, 3.75 wt % Rokrapol™ 7075

Example 6: Solderability of Screen Printed Copper Traces Prepared from Inks

Molecular inks were formulated in CuF:DEAPD (1:1 mol eq Cu:DEAPD), including 3 mol eq. water ($H_2O$) (based on moles CuF:DEAPD) and 3 wt % glycerol as additional solvents, as follows:
A. With 0 wt % copper nanoparticles and 0 wt % Rokrapol™ 7075.
B. With 0.4 wt % copper nanoparticles.
C. With 0.3 wt % Rokrapol™ 7075.
D. With 0.4 wt % copper nanoparticles and 0.3 wt % Rokrapol™ 7075.

The inks were printed on to Kapton™ films using a tape mask technique to produce ink traces of the same length (10 cm) having widths in a range of about 20-40 mil. The ink traces were sintered at 130° C. for 30 min, then 210° C. for 5 min, then 230° C. for 5 min (substrate temperature) under a nitrogen gas atmosphere containing 500 ppm oxygen gas.

Soldering was performed with a hand-held soldering iron using lead-free solder wire 97SC/SAC305 (96.5% Sn, 3% Ag, 0.5% Cu, melting point 217° C.). Solder iron tip temperature was about 330° C. Copper traces were cleaned using flux paste (MG chemicals 8341).

As illustrated in FIG. 1, copper traces produced from molecular inks A, B and C cannot be directly soldered. For copper traces produced from molecular inks A and B, the solder dissolves in the copper trace and does not wet the surface of the copper traces. Resistance is 43-49Ω and 13-17Ω, respectively, for copper traces produced from molecular inks A and B. For the copper trace produced from molecular ink C, the solder wets the surface of the trace but does not adhere. Further, the resistance of the trace produced from molecular ink C is 200-250Ω.

However, as illustrated in FIG. 1, the copper trace produced from molecular ink D can be directly soldered. With reference to D1, D2, D3 and D4 in FIG. 1, the solder wets the surface of the trace and adheres well (D1 and D2), does not dissolve copper (D3), and forms a strong copper solder joint (D4).

Figure 2:
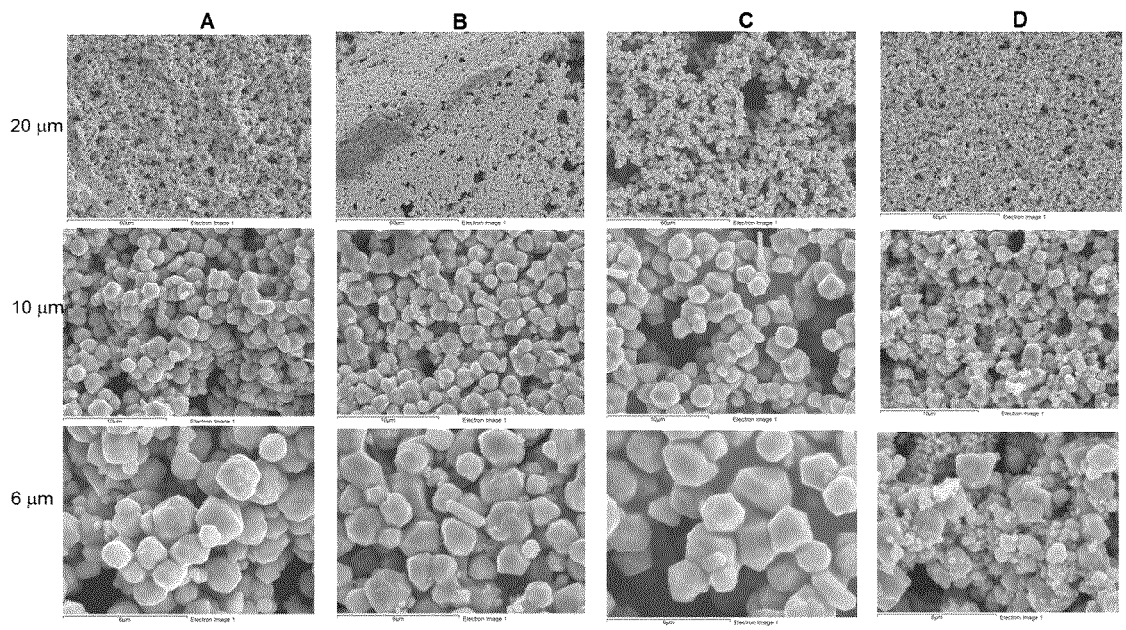
FIG. 2 depicts scanning electron micrographs (SEM) showing morphology of unsoldered copper traces depicted in FIG. 1 at scales of 20 μm, 10 μm and 6 μm (upper row to lower row).
Figure 3:
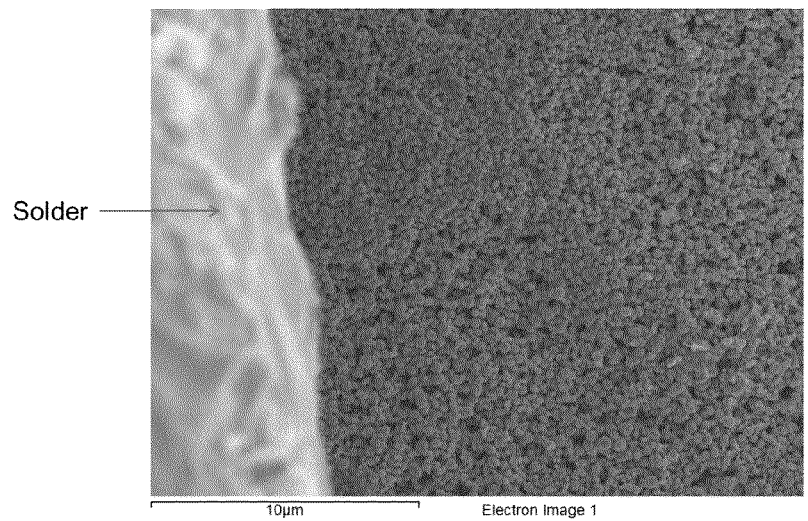
FIG. 3 depicts a scanning electron micrograph (SEM) showing morphology of the soldered copper trace depicted in FIG. 1 produced from molecular ink D.

FIG. 2 further illustrates the morphology of the unsoldered copper traces depicted in FIG. 1. It is evident from FIG. 2 that the copper trace produced from molecular ink D has a smooth and robust surface in comparison to the copper traces produced from the molecular inks A, B and C. Additionally, as evidenced in FIG. 3, the soldered joint on copper trace produced from the molecular ink D is strong, exhibiting no breaks, no peel off and no flake off of the copper trace.

Example 7: Other Polymeric Binders

Comparative inks comprising copper nanoparticles (CuNP) and copper(II) formate anhydrate:3-diethylamino-1,2-propanediol (CuF:DEAPD) were formulated with other polymeric binders to assess performance of the comparative inks. It is apparent from the results illustrated below that selection of the polymeric binder is important for formulating an ink that can produce conductive copper traces having both direct solderabilty and longer term shelf stability, with increased conductivity and mechanical strength.

Phenalloy™ 2870

Phenalloy™ 2870 (from DynaChem) is a phenol-formaldehyde resin in ethanol solution having a viscosity of 2000 cps and a solids content of 70%.

A molecular ink was formulated in a similar manner as described above by mixing 0.4 wt % CuNP and 0.3 wt % of Phenalloy™ 2870 in CuF:DEAPD (1:1 mol eq Cu:DEAPD), and including 3 mol eq. water ($H_2O$) (based on moles CuF:DEAPD) and 1.25 wt % glycerol as additional solvents. The ink was screen printed on to a Kapton™ film to produce ink traces of the same length (10 cm) and various nominal line widths as shown in Table 16. The ink traces were sintered at 110° C. for 30 min, then 230° C. for 5 min, then 250° C. for 5 min (substrate temperature) under a nitrogen gas atmosphere containing 500 ppm oxygen gas. As shown in Table 18, copper traces prepared using Phenalloy™ 2870 have similar conductivity to the traces produced from Rokrapol™ 7075.

However, the sintered copper traces produced from Phenalloy™ 2870 oxidize faster, i.e. visibly turning black almost instantaneously) and failed all of the standard ASTM bend and crease tests (ASTM F1683-02) for flexibility.

TABLE 18

| nominal linewidth (mil) | measured linewidth (mil) | Δ (mil) | measured linewidth (μm) | line thickness (μm) | Ω | Ω/□ | sheet resistivity (mΩ/□/mil) | volume resistivity (μΩ·cm) |
|---|---|---|---|---|---|---|---|---|
| 2 | 3.93 | 0.97 | 99 | 0.59 | 4000 | 3.99 | 92.75 | 235 |
| 3 | 4.79 | 0.90 | 121 | 0.90 | 1200 | 1.46 | 51.73 | 131 |
| 5 | 6.02 | 0.51 | 152 | 1.20 | 513 | 0.78 | 37.06 | 94 |
| 10 | 11.99 | 1.00 | 304 | 1.60 | 213 | 0.65 | 40.86 | 103 |

TABLE 18-continued

| nominal linewidth (mil) | measured linewidth (mil) | Δ (mil) | measured linewidth (μm) | line thickness (μm) | Ω | Ω/□ | sheet resistivity (mΩ/□/mil) | volume resistivity (μΩ · cm) |
|---|---|---|---|---|---|---|---|---|
| 15 | 16.15 | 0.57 | 410 | 1.79 | 143 | 0.59 | 41.34 | 105 |
| 20 | 21.43 | 0.72 | 544 | 1.78 | 101 | 0.55 | 38.53 | 97 |

Poly(Vinyl Alcohol)

Poly(vinyl alcohol) was tested as a polymeric binder for ink formulations of the present invention. While the polymer was soluble in the amine diol (3-(diethylamino)-1-2-propanediol (DEAPD)), inclusion of copper formate hydrate in the mixture produced a precipitate. A corresponding copper ink formulated with 0.12 wt % of the polymer did not produce copper traces on a substrate when sintered.

Poly(Styrene Sulfonic Acid)

Poly(styrene sulfonic acid) was tested as a polymeric binder for ink formulations of the present invention. However, the polymer was found to be insoluble in the amine diol (3-(diethylamino)-1-2-propanediol (DEAPD) and insoluble in a mixture of copper formate hydrate and the amine diol. A corresponding copper ink formulated with 0.12 wt % of the polymer did not produce copper traces on a substrate when sintered.

Chitosan

Chitosan was tested as a polymeric binder for ink formulations of the present invention. However, the polymer was found to be insoluble in the amine diol (3-(diethylamino)-1-2-propanediol (DEAPD) and insoluble in a mixture of copper formate hydrate and the amine diol. A corresponding copper ink formulated with 0.12 wt % of the polymer did not produce copper traces on a substrate when sintered.

Poly(Ethylene Glycol) MN200

Poly(ethylene glycol) MN200 was tested as a polymeric binder for ink formulations of the present invention. While the polymer was soluble in the amine diol (3-(diethylamino)-1-2-propanediol (DEAPD) and a mixture of copper formate hydrate and the amine diol, a corresponding copper ink formulated with 0.12 wt % of the polymer only produced non-conducting copper traces with discontinuities on a substrate when sintered at 210-250° C.

PEG_Silane

A silylated polyethylene glycol (PEG_silane) was tested as a polymeric binder for ink formulations of the present invention. While the polymer was soluble in the amine diol (3-(diethylamino)-1-2-propanediol (DEAPD) and a mixture of copper formate hydrate and the amine diol, a corresponding copper ink formulated with 0.12 wt % of the polymer only produced non-conducting copper traces with discontinuities on a substrate when sintered at 210-250° C.

Poly(Acrylic Acid) Sodium Salt

Poly(acrylic acid) sodium salt was tested as a polymeric binder for ink formulations of the present invention. While the polymer was soluble in the amine diol (3-(diethylamino)-1-2-propanediol (DEAPD) and a mixture of copper formate hydrate and the amine diol, a corresponding copper ink formulated with 0.12 wt % of the polymer only produced non-conducting copper traces with discontinuities on a substrate when sintered at 210-250° C. Furthermore, the copper traces showed poor adhesion to the substrate.

Poly(Methacrylic Acid) Sodium Salt and Poly(Vinyl Butyral)

A combination of poly(methacrylic acid) sodium salt and poly(vinyl butyral) was tested as a polymeric binder for ink formulations of the present invention. The polymers were soluble in the amine diol (3-(diethylamino)-1-2-propanediol (DEAPD) and a mixture of copper formate hydrate and the amine diol. A corresponding copper ink formulated with 0.12 wt % of the polymer produced conducting copper traces, but the traces adhered poorly to the substrate.

Lignin

Lignin was tested as a polymeric binder for ink formulations of the present invention. However, the polymer was found to be insoluble in the amine diol (3-(diethylamino)-1-2-propanediol (DEAPD) and insoluble in a mixture of copper formate hydrate and the amine diol. A corresponding copper ink formulated with 0.12 wt % of the polymer did not produce copper traces on a substrate when sintered.

Polyaniline Long Chain Grafted to Lignin

Polyaniline long chain grafted to lignin was tested as a polymeric binder for ink formulations of the present invention. While the polymer was soluble in the amine diol (3-(diethylamino)-1-2-propanediol (DEAPD)), inclusion of copper formate hydrate in the mixture produced a precipitate. A corresponding copper ink formulated with 0.12 wt % of the polymer did not produce copper traces on a substrate when sintered.

REFERENCES

The contents of the entirety of each of which are incorporated by this reference.

Chen W, Deng D, Chenge Y, Xiao F. J. (2015) *Electronics Materials*. 44(7), 2479.

Chung W, Hwang H, Kim H. (2015) *Thin Solid Films*. 580, 61-70.

Curtis C, Rivkin T, Miedaner A, Alleman J, Perkins J, Smith L, Ginley D. (2001) NREL/CP-520-31020.

Dang Z-M, Zhang B, Li J, Zha J-W, Hu G-H. (2012) *J. Applied Polymer Science*. 126, 815.

Farraj Y, Grouchko M, Magdassi S. (2015) *Chem. Commun.* 51, 1587.

Hu Y, An B, Niu C, Lv W, Wu Y. (2014) International Conference on Electronic Packaging Technology. 1565.

Lee B, Kim Y, Yang S, Jeong I, Moon J. (2009) *Current Applied Physics*. 9, e157-e160.

Pham L Q, Sohn J H, Kim C W, Park J H, Kang H S, Lee B C, Kang Y S. (2012) *J. Colloid and Interface Science*. 365, 103-109.

Schulz D L, Curtis C J, Ginley D S. (2001) *Electrochemical and Solid State Letters*. 4(8), C58-C61.

Shin D-H, Woo S, Yem H, Cha M, Cho S, Kang M, Jeong S, Kim Y, Kang K, Piao Y. (2014) *ACS Appl. Mater. Interfaces*. 6, 3312.

Szeremeta J, Nyk M, Chyla A, Strek W, Samoc M. (2011) *Optical Materials*. 33, 1372-1376.

Tsai C-Y, Chang W-C, Chen G-L, Chung C-H, Liang J-X, Ma W-Y, Yang T-N. (2015) *Nanoscale Research Letters*. 10, 357.

Yabuki A, Tanaka S. (2012) *Mater. Res. Bull.* 47, 4107.

Yabuki A, Tachibana Y, Fathona I W. (2014) *Mater. Chem. & Phys.* 148, 299.

U.S. Pat. No. 4,248,921 issued Feb. 3, 1981.

U.S. Pat. No. 4,396,666 issued Aug. 2, 1983.
U.S. Pat. No. 4,687,597 issued Aug. 18, 1987.
U.S. Pat. No. 5,045,236 issued Sep. 3, 1991.
U.S. Pat. No. 5,248,451 issued Sep. 28, 1993.
U.S. Pat. No. 6,036,889 issued Mar. 14, 2000.
U.S. Pat. No. 7,211,205 issued May 1, 2007.
U.S. Pat. No. 7,731,812 issued Jun. 8, 2010.
U.S. Pat. No. 9,145,503 issued Sep. 29, 2015.
U.S. Patent Publication 2008/0108218 published May 8, 2008.
U.S. Patent Publication 2015/0257279 published Sep. 10, 2015.
Korean Patent 101350507 issued Jan. 17, 2014.
Korean Patent Publication Abstract 2012/0132424 published Dec. 5, 2012.
Korean Patent Publication Abstract 2015/0045605 published Apr. 29, 2015.
Korean Patent Publication Abstract 2015/0077676 published Jul. 8, 2015.
Korean Patent Publication Abstract 2015/0082133 published Jul. 15, 2015.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. An ink comprising an admixture of:
   (a) a copper nanoparticle;
   (b) a copper precursor molecule; and,
   (c) a polymeric binder comprising a hydroxyl- and/or carboxyl-terminated polyester.

2. The ink according to claim 1, wherein the copper precursor molecule comprises a copper-aminediol complex.

3. The ink according to claim 2, wherein the copper-aminediol complex comprises a compound of Formula (I):

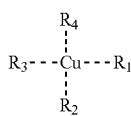

(I)

where $R_1$, $R_2$, $R_3$ and $R_4$ are the same or different and are $NR_5R_6(R'(OH)_2)$ or —O—(CO)—R", and at least one of $R_1$, $R_2$, $R_3$ or $R_4$ is $NR_5R_6(R'(OH)_2)$, wherein: $R_5$ and $R_6$ are independently H, $C_{1-8}$ straight chain, branched chain or cyclic alkyl, $C_{2-8}$ straight chain, branched chain or cyclic alkenyl, or $C_{2-8}$ straight chain, branched chain or cyclic alkynyl; R' is $C_{2-8}$ straight chain, branched chain or cyclic alkyl; and, R" is H or $C_{1-8}$ straight chain, branched chain or cyclic alkyl.

4. The ink according to claim 3, wherein two of $R_1$, $R_2$, $R_3$ or $R_4$ are $NR_5R_6(R'(OH)_2)$.

5. The ink according to claim 3, wherein $R_5$ and $R_6$ are independently H or $C_{1-4}$ straight chain alkyl and R" is H or $C_{1-4}$ straight chain alkyl.

6. The ink according to claim 3, wherein R" is H.

7. The ink according to claim 3, wherein the OH groups on a given R' substituent are not bonded to the same carbon atom.

8. The ink according to claim 1, wherein the copper precursor molecule comprises copper(II) formate anhydrate: 3-dimethylamino-1,2-propanediol (CuF:DMAPD), copper (II) formate anhydrate:3-diethylamino-1,2-propanediol (CuF:DEAPD), copper(II) formate anhydrate:3-methylamino-1,2-propanediol (CuF:MAPD), copper(II) formate anhydrate:3-amino-1,2-propanediol (CuF:APD), $Cu(OH)_2$: ethanolamine, $Cu(OH)_2$:diethanolamine or $Cu(OH)_2$:triethanolamine.

9. The ink according to claim 1, wherein the copper nanoparticles are present is in a range of about 0.25-5 wt %, based on total weight of the ink.

10. The ink according to claim 1, wherein the polymeric binder is present in a range of about 0.25-1 wt %, based on total weight of the ink.

11. The ink according to claim 1, wherein the copper precursor compound is present in a range of about 84 wt % or more, based on total weight of the ink.

12. A process for producing a conductive solderable copper trace on a substrate, the process comprising depositing an ink as defined in claim 1 on a substrate and sintering the ink on the substrate to produce a conductive solderable copper trace on the substrate.

13. The process according to claim 12, wherein the depositing comprises screen printing the ink on the substrate.

14. An electronic device comprising a substrate comprising a conductive solderable copper trace produced by a process as defined in claim 12.

15. The electronic device according to claim 14, wherein the substrate comprises polyethylene terephthalate (PET), polyolefin, polydimethylsiloxane (PDMS), polystyrene, polycarbonate, polyimide, a silicone membrane, a textile, a thermoplastic polyurethane, paper, glass, metal or a dielectric coating.

16. The electronic device according to claim 14, wherein the substrate comprises polyethylene terephthalate or polyimide.

17. The electronic device according to claim 14 comprising an electrical circuit, a conductive bus bar, a sensor, an antenna, a thin film transistor, a diode or smart packaging.

* * * * *